United States Patent

[11] 3,615,686

[72] Inventor Robert Swinburn Marshall
Lowestoft, England
[21] Appl. No. 845,970
[22] Filed July 30, 1969
[45] Patented Oct. 26, 1971
[73] Assignee Lever Brothers Company
New York, N.Y.
[32] Priority Aug. 5, 1968
[33] Great Britain
[31] 37343/68

[54] SHAPING OF FOODSTUFFS
7 Claims, 1 Drawing Fig.
[52] U.S. Cl. .................................................. 99/100 P,
99/1, 99/109, 99/111, 99/193, 99/194, 99/195,
264/28
[51] Int. Cl. ..................................................... A23p 1/00

[50] Field of Search.......................................... 99/111,
195, 193, 194, 100 P, 107, 108, 109, 1; 17/35, 40;
264/28

[56] References Cited
UNITED STATES PATENTS
2,812,260  11/1957  Keane et al. ..................  99/194

*Primary Examiner*—A. Louis Monacell
*Assistant Examiner*—Robert M. Elliott
*Attorneys*—Louis F. Kline, Jr., Melvin H. Kurtz and Edgar E. Ruff ABSTRACT: A method of forming unit portions of foodstuffs such as reformed shrimp in which the food material is extruded through a nozzle which is of distorted or helical form while in a frozen state and is then subdivided and set in its distorted or helical form.

PATENTED OCT 26 1971 3,615,686
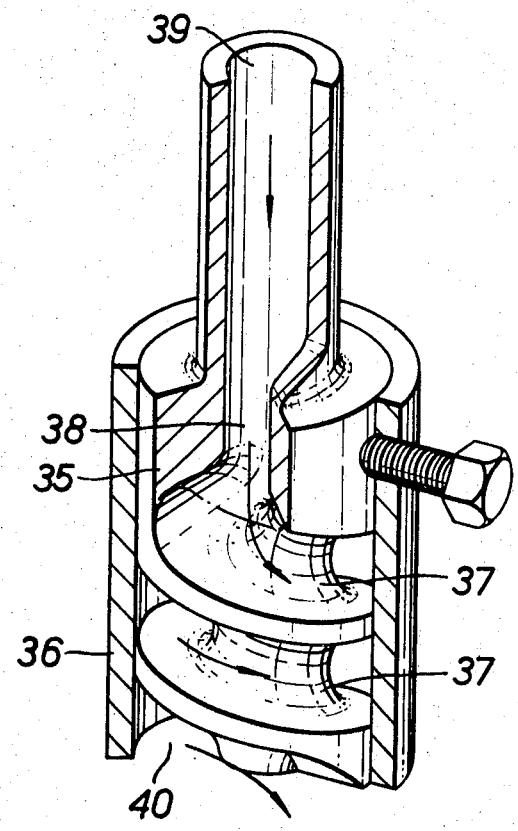
INVENTOR:
ROBERT SWINBURN MARSHALL
BY *[signature]*
HIS ATTORNEY

SHAPING OF FOODSTUFFS

The invention relates to the treatment of foodstuffs, and in particular to the shaping of frozen fish, including crustacea, into unit portions. By the term "unit portions" we mean a portion of a size suitable for packaging, sale and serving for consumption without further subdivision.

In order to satisfy consumer demand for unit portions of fish, fresh unfrozen fish consisting of separate fillets may be placed in trays and therein compressed in the form of blocks which are then frozen and subsequently sawn or cut into unit portions. These unit portions are usually coated with a breading or with batter, which may be firmed by cooking, before finally packing and storing in a frozen condition until required for consumption or sale. Such methods are currently used in the manufacture of "fish fingers" or "fishsticks" and in other unit portion frozen fish products such as "cod portions" or "cod steaks." The cutting or sawing of a block of frozen fish, however, unavoidably causes excessive wastage of a proportion of the fish as sawdust or chippings as well as necessitating high maintenance cost of the cutting equipment itself. Furthermore, where unit portions of a particular shape, for example trapezoids, are manufactured, it can be difficult to ensure that portions of uniform dimensions and weight are produced. This is likely to present difficulties where legislation exists in respect of packaged weight specification.

It is generally desirable when producing unit portions of fish to retain in each unit portion as much of the texture, character, quality and appearance of the original whole fillet as possible. This may be achieved by applying a moulding or extrusion operation to fish prior to freezing.

We have now discovered that it is possible to apply an extrusion operation to foodstuffs while they are in a frozen state and to provide a particular form to the extruded material by forcing the frozen material through a nozzle which has a contorted passageway. We have found that provided the temperature and condition of the foodstuffs is correct, a degree of memory will be imparted to the extruded product so that it will take the form of the contorted passageway.

More particularly the present invention provides a method of forming unit portions of foodstuffs comprising the steps of extruding a food material while in a frozen state through a nozzle defining a contorted passageway and setting and subdividing the frozen extruded material, the setting step being the application of a treatment to the extruded material so that the shape determined by the contorted passageway is retained after thawing.

Thus the invention enables a number of marketable shaped food products to be produced for example reformed shrimp, reformed crinkle-cut french fries, small curled cocktail sausages and the like.

It should be mentioned at this point that the invention is not concerned with the shaping of products like ice cream but with products which normally thaw before consumption e.g. in a cooking operation.

Applying the contorted shaping to the product while in the frozen state has a number of advantages, in particular the necessity of first thawing the frozen foodstuff and then refreezing for frozen storage is unnecessary and this is particularly useful with fish, and products produced in this manner by shaping in the frozen state also apparently exhibit a greater resistance to breakage on thawing than portions shaped prior to the freezing.

As previously mentioned the invention is applicable to foodstuffs which are intended to be thawed before consumption. Normally such foodstuffs would be cooked for consumption although this is not always essential. Foodstuffs which are suitable are for example fish, meat, vegetables or fruit, but do not include ice cream or other frozen confections which are not intended to be cooked and which do not retain their shape and configuration if cooked.

The setting step is usually applied to the extruded material while it is still in the frozen state. The setting step will depend on the particular foodstuff which is being extruded and in the case of fish may be the application of a breading or batter coating which is subsequently at least partly fried to set the breading or batter in a conventional manner. In the case where the foodstuff is sausage meat the setting step may comprise at least briefly contracting the surface of the frozen extruded material with hot fat or oil to case harden its exterior, for example by briefly immersing the product in a bath of the hot fat or oil or by spraying its surface with such a hot fat or oil. In the case where the product is a mixture of mashed potato and a setting agent for the formation of reformed crinkle-cut french fries the setting step may be similar to that for sausage meat.

The contorted passageway of the extrusion nozzle is preferably in the form of a helix of at least two turns. Such an extrusion nozzle is suitable for the production of skinless cocktail sausages or extruded reformed shrimp. In the case of crinkle-cut french fries the nozzle has a form which imparts to the frozen potato mix a crinkle-cut outline.

The starting material from which the extruded products are made may be a fresh foodstuff which is first frozen and then subdivided if necessary into pieces or portions of a size suitable for feeding to an extruder. Small pieces, fragments or comminutes of the frozen foodstuff may also be used, the particulate size being a matter of choice available to the food technologist depending on the nature of the product that he is proposing to manufacture. Alternatively, the starting material may be received in a prefrozen state, in which case it is, if necessary, subdivided into pieces of a convenient size for extrusion. In the case of fish, it may be desirable to retain as far as possible the natural muscle structure of the fish, in which case the subdivision of fish fillets is minimized.

The temperature at which the foodstuff is extruded is important inasmuch as too low a temperature may result in seizure of the foodstuff within the extrusion equipment or in fracture of the raw material under the pressure necessary to extrude it with consequent loss of unity within the product due to breakage during post-shaping processing. Too high a temperature on the other hand may result in thawing of the product with consequent loss of process and product uniformity and loss of advantage accrued from keeping frozen a product which is destined to be sold in the frozen state.

It is therefore important to ensure that parts of the equipment in contact with the foodstuff during the transfer of the foodstuff to, through or into the extrusion apparatus are kept at a temperature suited to the operation. Temperature control of the equipment may be facilitated by providing channels or jackets for heating or cooling fluids as appropriate in or around these parts of the equipment.

In the case of fish, the temperature at which extrusion is carried out is dependent on a number of interrelated parameters such as the nature and size of the individual pieces or particles of the fish, the presence in the fish of additives such as salt or phosphate and hence the freezing point of the mass of fish to be extruded, the pressure applied during extrusion and the nature of the extrusion equipment. However, it is important when assessing the importance of such parameters to ensure that the mass of frozen fish is at a temperature at which it exhibits the necessary degree of plasticity and/or elasticity for successful extrusion. Similar considerations apply to the extrusion of other foodstuffs.

The selection of a suitable temperature is therefore critical to the extrusion operation, since the foodstuff must be in a frozen state immediately before, during and immediately after extrusion. The presence, for example, of salts, sugars and other hydrophylic materials in the foodstuff may depress its freezing point to an extent that the foodstuff does not become frozen until the temperature is lowered to about $-15°$ C. to $-20°$ C. or even lower. As a general guide, however, a suitable extrusion temperature may be between $-15°$ C. and $0°$ C. and we have found that a preferred value is up to about $5°$ C. below the freezing point of the foodstuff. Thus, for fish which normally freezes at $-1°$ C. we prefer to employ an extrusion temperature of between $-2°$ C. and $-6°$ C.

It is indeed surprising that a mass of relatively large pieces of filleted frozen fish may be shaped by extrusion under moderate pressure without substantial destruction of the muscle structure inherent in the fillet. It is also surprising to find that movement of the frozen mass of fish under pressure within a confined space, such as pumping through pipes from a bulk supply to and through an extrusion nozzle or die, is possible in spite of the fact that the fish is frozen. Furthermore, the shaped fish exhibits a degree of cohesive binding of the individual pieces of fish which is unexpected, the shaped fish thereby being more resistant to fracture or fragmentation during post-extrusion handling and also being more resistant to breakage when being prepared for consumption in the thawed state.

Phosphate may of course be added to the fish before shaping to improve the retention of water within the fish muscle when it is eventually thawed, for example before consumption. The presence of phosphate in its role of a water binding agent will inherently provide a degree of lubrication and of cohesive binding together of the pieces of fish which may be advantageous to the manufacture of unit portions of fish on a factory scale.

Suitable phosphates which may be added as water binding agents are edible food grade forms and preferably comprise polyphosphates, for example tripolyphosphate, tetrapolyphosphate or hexametaphosphate. Orthophosphate and pyrophosphate may alternatively be use but they have been found to be less effective in retaining the water otherwise lost from the fish on thawing than have polyphosphates. Mixtures of phosphates as are normally commercially available for use as food additives and comprising a major proportion of polyphosphate and a minor proportion of other phosphates are more convenient.

The pressure applied to the fish necessary to shape it will itself depend on the other interrelated parameters already mentioned. The pressure suitable for extrusion also depends on the dimensions of the die or nozzle passageway and orifice and hence will be different for different pieces of equipment.

It is therefore not possible to generalize on suitable pressures that may be applicable but examples will be provided in the description of specific embodiments of the invention, in order to illustrate the order of magnitude that is suitable for a particular set of conditions. As a general guide, however, it will usually not be necessary to apply pressures in excess of 200 kg./sq.cm. in order to effect extrusion of unit portions of frozen foodstuffs.

A particular aspect of the invention is illustrated by an example describing the preparation of reconstituted shrimp:

Frozen shrimp and shrimp pieces at a temperature of −5° C. were pumped from a bulk supply to an extrusion nozzle which consisted of a helical passageway through which the light-absorbing shrimp was forced before emerging from the nozzle orifice. The extruded shrimp retained the form of a helix, provided that the helical passageway within the nozzle consisted of at least two complete turns. The extruded frozen shrimp was also resistant to accidental breakage but could be readily severed into pieces of a size and having the curled configuration of shrimp, Subsequently the pieces were battered and lightly fried, while still internally frozen, to set the batter and retain the extruded shape even after thawing.

A further example of extrusion shaping as applicable to foodstuffs other than fish is provided by a description of a process for the manufacture of reformed crinkle-cut french fries:

A mix comprising cooked mashed potato made from 20 percent solid potatoes and containing 0.5 percent carboxymethylcellulose was cooled to −3° C. and pumped at a pressure of 30 kg./sq.cm. through an extrusion nozzle which imparted to the frozen potato mix a "crinkle-cut" outline. The extruded mix was cut into french fry lengths of between 7–12 cm. and dipped briefly into hot fat to provide a casehardened outer layer to each french fry. The interior of the french fries did not thaw and were immediately packed and deep frozen for storage. On thawing for cooking and consumption, the crinkle-cut outline was retained.

Yet a further example of extrusion shaping is illustrated by the following description of the manufacture of skinless cocktail sausages:

A sausage meat mix was deep frozen to −20° C. and then tempered to −6° C. overnight before further processing. Pieces of the frozen mix were fed to a stuffer refrigerated to about −6° C. to −7° C., consolidated therein and then pumped to a nozzle having a 2½ turn helical passageway of average diameter of 10 mm. The helix of frozen sausage meat which emerged was passed briefly through a bath of hot oil at 170° C. in order to case harden the exterior of the sausage helix against deformation on subsequent thawing, and the helix was refrozen and broken into curled pieces of about 4 cm. in length which were of a dimension appropriate to a cocktail sausage. These were held in frozen storage until subsequently required for cooking and consumption.

Frozen fish and food products extruded according to the invention may be treated by any of a number of known optional procedures such as battering, breading, crumbling and frying, before subsequently being packed and stored in a frozen condition.

Apparatus suitable for use in connection with the embodiments of the invention outlined above will now be described and illustrated by way of example with reference to the accompanying diagrammatic drawing, of which:

The FIGURE is a part sectioned perspective view of an extrusion nozzle for use in extrusion shaping.

An extrusion nozzle suitable for "extrusion shaping" is illustrated in the figure and consists of a cylindrical block of polytetrafluoroethylene 35 positioned in a sleeve 36. The nylon block has a helical cavity 37 which is linked to feed pipe 38 by feed chamber 39. The helical cavity exits at nozzle orifice 40.

In operation, frozen fish such as shrimp is fed under pressure via feed pipe 38 to the feed chamber 39 and thence via helical cavity 37 to nozzle orifice 40 from where the frozen fish emerges as a formal helix.

What is claimed is:

1. A method of forming unit portions of foodstuffs comprising the steps of extruding a food material while in a frozen state through a nozzle defining a contorted passageway, to give the food a distorted shape, and setting and subdividing the frozen extruded material, the setting step being the application of a setting treatment to the extruded material so that the shape determined by the contorted passageway is retained after thawing.

2. A method according to claim 1 in which the setting step is applied to the extruded material while it is still in the frozen state.

3. A method according to claim 1 in which the contorted passageway is in the form of a helix of at least two turns.

4. A method according to claim 2 in which the material is fish and the setting step comprises applying an edible coating and at least partly frying the extruded material to set the edible coating.

5. A method according to claim 3 in which the food is shrimp and helical portions are formed to simulate shrimp in shape.

6. A method according to claim 1 in which the material is sausage meat and the setting step comprises at least briefly contacting the surface of the frozen extruded material with hot fat or oil to case harden its exterior.

7. A method according to claim 1 in which the material is a mixture of mashed potato and a setting agent and is extruded in a frozen state to form reformed crinkle-cut french fries which are subsequently set by contacting their surfaces at least briefly with hot fat or oil to case harden their exteriors.

* * * * *